United States Patent
Fons et al.

[19]

[11] Patent Number: 6,082,021
[45] Date of Patent: Jul. 4, 2000

[54] METHOD AND APPARATUS FOR TREATING A BED OF PARTICULATE MATERIAL

[75] Inventors: Mogens Juhl Fons, Charlottenlund; Jorn Touborg, Copenhagen, both of Denmark

[73] Assignee: F. L. Smidth & Co. A/S, Denmark

[21] Appl. No.: 09/028,169

[22] Filed: Feb. 23, 1998

Related U.S. Application Data

[63] Continuation of application No. PCT/EP96/02971, Jul. 5, 1996.

[30] Foreign Application Priority Data

Aug. 24, 1995 [DK] Denmark .................................. 0942/95
Nov. 20, 1995 [DK] Denmark .................................. 1297/95

[51] Int. Cl.[7] .................................................. F26B 3/00
[52] U.S. Cl. ............................... 34/364; 34/369; 34/358; 34/570
[58] Field of Search .............................. 34/359, 360, 364, 34/369, 558, 565, 570; 110/285, 291, 347; 432/69, 79, 80

[56] References Cited

U.S. PATENT DOCUMENTS

| | | |
|---|---|---|
| 2,629,938 | 3/1953 | Montgomery .............................. 34/369 |
| 3,276,755 | 10/1966 | Bast . |
| 4,354,438 | 10/1982 | Beckmann . |
| 4,367,065 | 1/1983 | Cnare . |
| 4,387,667 | 6/1983 | Goodstine et al. . |
| 4,728,287 | 3/1988 | Niems . |
| 4,732,561 | 3/1988 | Eiring et al. . |
| 4,760,779 | 8/1988 | Morris ....................................... 34/364 |
| 5,348,449 | 9/1994 | Wilke et al. . |

FOREIGN PATENT DOCUMENTS

| | | |
|---|---|---|
| 0036409 | 3/1981 | European Pat. Off. . |
| 0219745 | 10/1986 | European Pat. Off. . |
| 0245630 | 3/1987 | European Pat. Off. . |
| 0442129 | 12/1990 | European Pat. Off. . |
| 2327903 | 6/1973 | Germany . |
| 2752422 | 5/1979 | Germany . |
| 3025599 | 2/1982 | Germany . |
| 1221984 | 7/1996 | Germany . |
| 57-172105 | 1/1983 | Japan . |
| 8201041 | 8/1986 | Sweden . |
| WO 9712840 | 6/1994 | WIPO . |

*Primary Examiner*—Stephen Gravini
*Attorney, Agent, or Firm*—Baker Botts L.L.P.

[57] ABSTRACT

A bed (6; 78) of particulate material, which is supported by a gas distribution bottom (9; 75), is located utilizing a treatment gas, which via ducts (19; 35; 77) is conducted in sectionalized manner to and directed up through the gas distribution bottom and the bed of material from one or several underlying compartments (15; 76). The flow of the treatment gas through each duct (19; 35; 77) is self regulated by means of a flow regulator (21) provided in each duct. It is thereby obtained that the total pressure loss across the gas distribution bottom can be reduced, that the flow of the treatment gas through the material bed is distributed in a desirable and well-defined manner across the entire gas distribution bottom regardless of the composition of the material bed and the distribution thereon, and that tunnel formations are avoided.

16 Claims, 5 Drawing Sheets

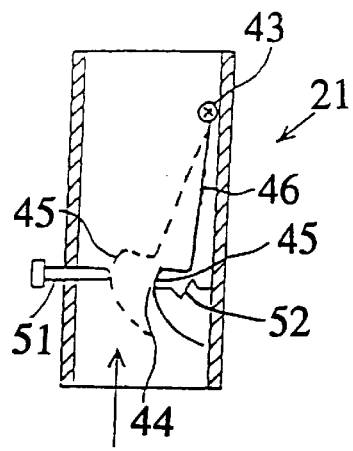
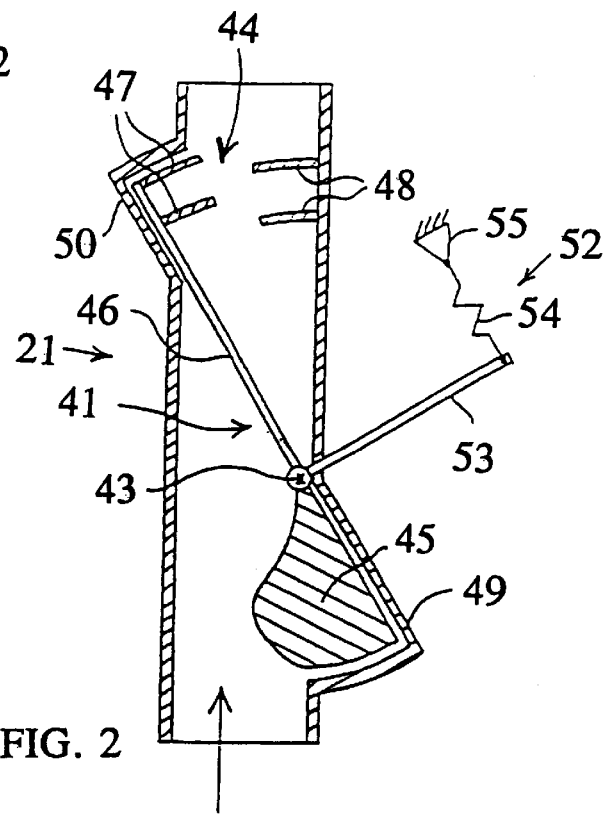
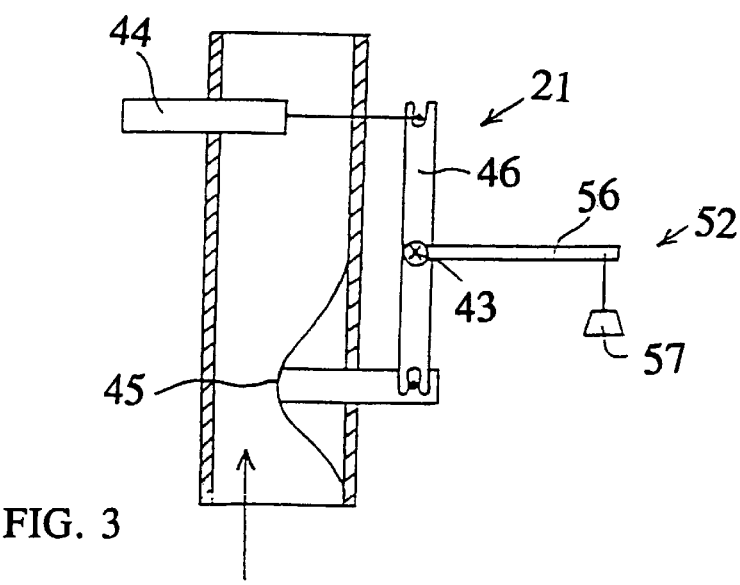

METHOD AND APPARATUS FOR TREATING A BED OF PARTICULATE MATERIAL

This application is a continuation of PCT/EP 96/02971 filed Jul. 5, 1996.

BACKGROUND OF THE INVENTION

The present invention relates to a method for treating a bed of particulate material which is supported by a gas distribution bottom, utilizing a treatment gas which via ducts is conducted in sectionalized manner to and directed up through the gas distribution bottom and the bed of material from one or several underlying compartments. The invention relates also to an apparatus for carrying out the method according to the invention.

Within the industrial sector there are numerous examples of apparatuses which comprise a gas distribution bottom. As nonlimiting examples hereof can be mentioned fluidized bed reactors, chemical reactors, drying apparatus, gas-solid heat exchangers and others.

Essentially, the functions of the gas distribution bottom is to support the bed of material and to distribute the treatment and fluidizing gas uniformly across the entire bed. The construction of the gas distribution bottom is also of importance both for the physical and chemical efficiency of the bed. To-day it is a generally recognized and reluctantly acknowledged fact that a relatively high pressure drop across the gas distribution bottom is required to ensure uniform distribution of the gas across the entire bottom, since improper distribution of the gas flow will often lead to poor gas-solid contact and formation of tunnels. Often, a gas distribution bottom is characterized by the relationship between the pressure drop across the gas distribution bottom and the pressure drop across the bed. In technical literature, it is typically recommended that the gas distribution bottom be configured so that this relationship will be 0.40 or higher, i.e. the pressure drop across the bottom is at least 40% of that across the bed. However, this relatively high pressure drop across the gas distribution bottom entails an excessively high energy consumption of the fan installation which propels the treatment gas through the apparatus.

An example of an apparatus which comprises a gas distribution bottom is a grate cooler for cooling, for example, cement clinker. In such a cooler the primary aim is to achieve a favourable degree of heat exchange between the clinker and the cooling gas so that essentially all the thermal energy contained in the hot clinker can be returned to the kiln system in the cooling gas, while, at the same time, the clinker is discharged from the cooler at a temperature which is very close to the ambient temperature. It is a precondition for achieving a favourable degree of heat exchange that the cooling gas flow through the clinker is well-defined.

In connection with the cooling of cement clinker which is discharged from a kiln installed ahead of the cooler it has, however, emerged that the clinker is not always uniformly distributed on the cooler grate. Instead, there is a tendency towards the clinker being distributed so that the larger clinker lumps are predominantly located at one side of the cooler, whereas the finer clinker lumps are located at the other side. Also, the thickness of the clinker bed may exhibit variations both longitudinally and transversely through the cooler. Since it is easier for the cooling gas to penetrate a bed of larger clinker lumps and/or a thinner bed as compared to penetrating a bed of finer clinker lumps and/or a thicker bed, and since, quite naturally, the cooling gas will always follow the route of least resistance, any such uneven distribution of clinker often entails that the finer clinker material is not sufficiently cooled, hence causing hot zones, so-called "red rivers", to be formed in the cooler. Such uneven distribution of the clinker may also entail that the cooling gas in the areas where it encounters least resistance will simply blow the material away and form tunnels, through which the cooling gas will escape without any noteworthy exchange of heat with the clinker material. Therefore, optimum efficiency of a cooler operating under such conditions cannot be achieved.

In order to reduce the importance of the uneven penetrability of the clinker bed of the cooler gas and to ensure a more evenly distributed cooling gas flow across the entire surface of the grate, it has been proposed that the grate proper be provided in such a way that the grate itself will put up great resistance to the penetration of the cooling gas. However, this solution entails a major pressure loss across the grate, involving substantial costs for the erection and operation of the fan installation. At the same time, it does not eliminate the problems in terms of tunnel formations.

From EP-A-0 442 129 is known a method and a grate cooler by means of which the aforementioned problem is claimed to be minimized by feeding additional cooling gas in pulses to the areas of the bed in which the temperature is higher than in the surrounding areas of bed, whereby the first-mentioned areas of bed are cooled further and subjected also to agitation. A distinct disadvantage of this known solution is the relatively expensive and complicated manner in which the control operation for the additional cooling gas supply is carried out. Controlling involves that the temperature of the entire surface area of the material bed is measured and recorded in order to establish a temperature profile which, via a calculating and controlling unit, forms the overall basis for controlling a number of valves which admit and shut off, respectively, the supply of additional cooling gas to nozzles which are fitted under the grate in a structured pattern. Also, the agitation of the material bed may have a negative effect on the efficiency of the cooler.

A second example of an apparatus comprising a gas distribution bottom is a fluidized bed kiln which is used e.g. in heat and power plants. In a fluidized bed the primary aim is to ensure efficient combustion of the input fuel under stable and optimum operating conditions. In this context, it is a precondition that the fluidizing gas is evenly distributed across the entire bed.

In the fluidized bed kiln there are known problems in terms of tunnel formations similar to those described above in connection with the cooler example. In the fluidized bed kiln the problem is also believed to be attributable to the fact that the thickness of bed is not uniform, thereby causing the fluidizing gas to penetrate, with a self-energizing effect, the bed at the point of least thickness and, therefore, the point of least resistance. In order to minimize the problem and to achieve a more uniform distribution of the fluidizing gas, the gas distribution bottom has been provided in similar manner as done in the clinker cooler, so that it put up great resistance to the penetration of the fluidizing gas. However, it has been ascertained that, nor in fluidized bed kilns, has this solution led to elimination of the problem in terms of tunnel formations.

SUMMARY OF THE INVENTION

It is the objective of the present invention to provide a method as well as an apparatus for treating a bed of particulate material by means of which favourable and stable operating conditions without any formation of tunnels can be achieved while simultaneously reducing the operating costs of the fan installation.

DE-A-1221984 discloses a method for treating a bed of particulate material which is supported by a gas distribution bottom, utilizing a treatment gas which via ducts is conducted in sectionalized manner to and directed up through the gas distribution bottom and the bed of material from one or several underlying compartments; the flow of the treatment gas through each duct being regulated by means of a flow regulator provided in each duct, each flow regulator being automatically movable in direct response to the gas flow condition in the respective duct; and, according to the present invention, such a method is characterised in that the regulation is effected continuously within an operational range.

The invention also includes an apparatus for treating a bed of particulate material, the apparatus comprising a gas distribution bottom for supporting the bed to be treated and provided with a number of ducts for sectionalized supplying of treatment gas from one or several underlying compartments; each duct having a respective flow regulator which is automatically movable in direct response to the gas flow condition in the respective duct; characterised in that the flow regulator is arranged to provide a continuous regulation of the gas flow within an operational range.

Hereby it is obtained that the total pressure loss across the gas distribution bottom can be reduced, that the flow of the treatment gas through the material bed is distributed in a desirable and well-defined manner across the entire gas distribution bottom, regardless of the composition of the material bed and the distribution thereon, and that tunnel formations are avoided. This is due to the automatic regulation of the gas flow which is continuously effected in each duct in direct response to the gas flow during the operation of the apparatus. In case of a change in the material composition and/or the bed thickness in an area of the material bed, entailing, for example, a drop in the level of resistance to penetration of the gas in this area, which is typical in connection with a beginning tunnel formation, the flow regulator in the duct under the particular area will normally provide that the passage area in this duct is reduced so that the gas flow through this area does not rise, but instead is reduced or at least kept constant. This will enable the material bed to re-establish itself while simultaneously ensuring that only the gas volume required for the treatment is directed through the bed in the particular area. In the opposite case, where the resistance of bed increases e.g. as a consequence of a thicker bed, the flow regulator will provide for an increased passage cross sectional area in the underlying duct, and thereby that the gas flow through this area is not reduced, but instead is increased or at least kept constant. So, expressed in other words, it may be said that each single flow regulator compensates for the changes in the flow resistance of the superjacent material bed, so that the best possible aerating is maintained at the lowest possible pressure drop.

Thus, although the invention can be used for obtaining a desired gas flow in any situation, whatever that gas flow might be, preferably it is arranged that, within an operational range, the gas flow does not decrease or increase as the pressure drops across the superjacent part of the bed increases or decreases, respectively.

In particular, the gas flow through each duct may be regulated so that it increases as the pressure drop across the superjacent part of the bed is increased, and, conversely, that it decreases as the pressure drop across the superjacent part of the bed is reduced. Alternatively, the regulation may be such that the gas flow is maintained substantially constant at any pressure drop occurring across the superjacent part of the bed.

In connection with a grate cooler it is thus obtained that the material is uniformly cooled to the desired temperature, that the heat recuperation is satisfactory, and that tunnel formations are avoided. In connection with a fluidized bed it is thus obtained that the fluidized bed exhibits a more stable behaviour without any tendency towards tunnel formations.

Sometimes, it may, for different reasons, be advantageous in certain types of apparatus to have a greater flow of the treatment gas in one or several specific areas as compared to other areas, and, therefore, it is possible according to the invention to carry out continuous or intermittent adjustments of the datum setting of each flow regulator in order to achieve the desired flow characteristics.

The adjustment of the datum setting of the flow regulators may be carried out manually or automatically using measuring and monitoring equipment which is connected to a control unit.

In a simple design, each flow regulator may be of a type which comprises one or several variable, venturi-like nozzle means constituting, by themselves, variable flow-limiting restrictors.

In this context, the expression "venturi-like nozzle means" refers to a nozzle in which the pressure upstream of the nozzle is, for the most part; recovered downstream of the nozzle.

In an extended design, each venturi-like venturi means may also be separately connected via a connecting means to a variable restriction means.

In another equally simple design each flow regulator may be of the type which comprises one or several variable, orifice-like nozzle means.

In this context, the expression "orifice-like nozzle means" refers to a nozzle in which the pressure loss across the nozzle is not recovered downstream of the nozzle.

Each orifice-like nozzle means may be designed so that it comprises at least two flow restriction means, which, in conjunction, define at least one nozzle opening, and that at least one of the flow restriction means is displaceable relative to the other(s) and connected to means for generating this displacement.

These means of displacement may be provided in any suitable manner, but it is preferred that each means comprises a movable plate on one side of which prevails the pressure $P_1$ upstream of the nozzle opening and on the other side of which prevails the pressure $P_2$ downstream of the nozzle opening, and that the movable plate is directly or indirectly connected to a characteristic controlling means.

It is further preferred that the flow restriction means are configured so that the total nozzle opening area for any pressure differential prevailing across the nozzle within a specific operating range precisely results in the desired gas flow through the duct.

Subject to varying operating environments, it would be advantageous for each flow regulator to be individually adjustable. Therefore, each single flow regulator may comprise means for adjusting its datum setting.

The apparatus may also comprise measuring and monitoring equipment which, via a control unit, is connected to the adjusting means of each single flow regulator.

BRIEF DESCRIPTION OF THE DRAWINGS

The invention will now be described in further details with reference to the attached diagrammatic drawing, in which:

FIG. 1 shows a first embodiment of a flow regulator which may be used according to the invention, FIG. 2 shows a second embodiment of a flow regulator which may be used according to the invention, FIG. 3 shows a third embodiment of a flow regulator which may be used according to the invention.

DESCRIPTION OF THE PREFERRED EMBODIMENTS

In FIGS. 1 to 5 are shown five non-limiting examples of simple, inexpensive and mechanical flow regulators 21 which can be used according to the invention.

Figures 4, 5, 6:
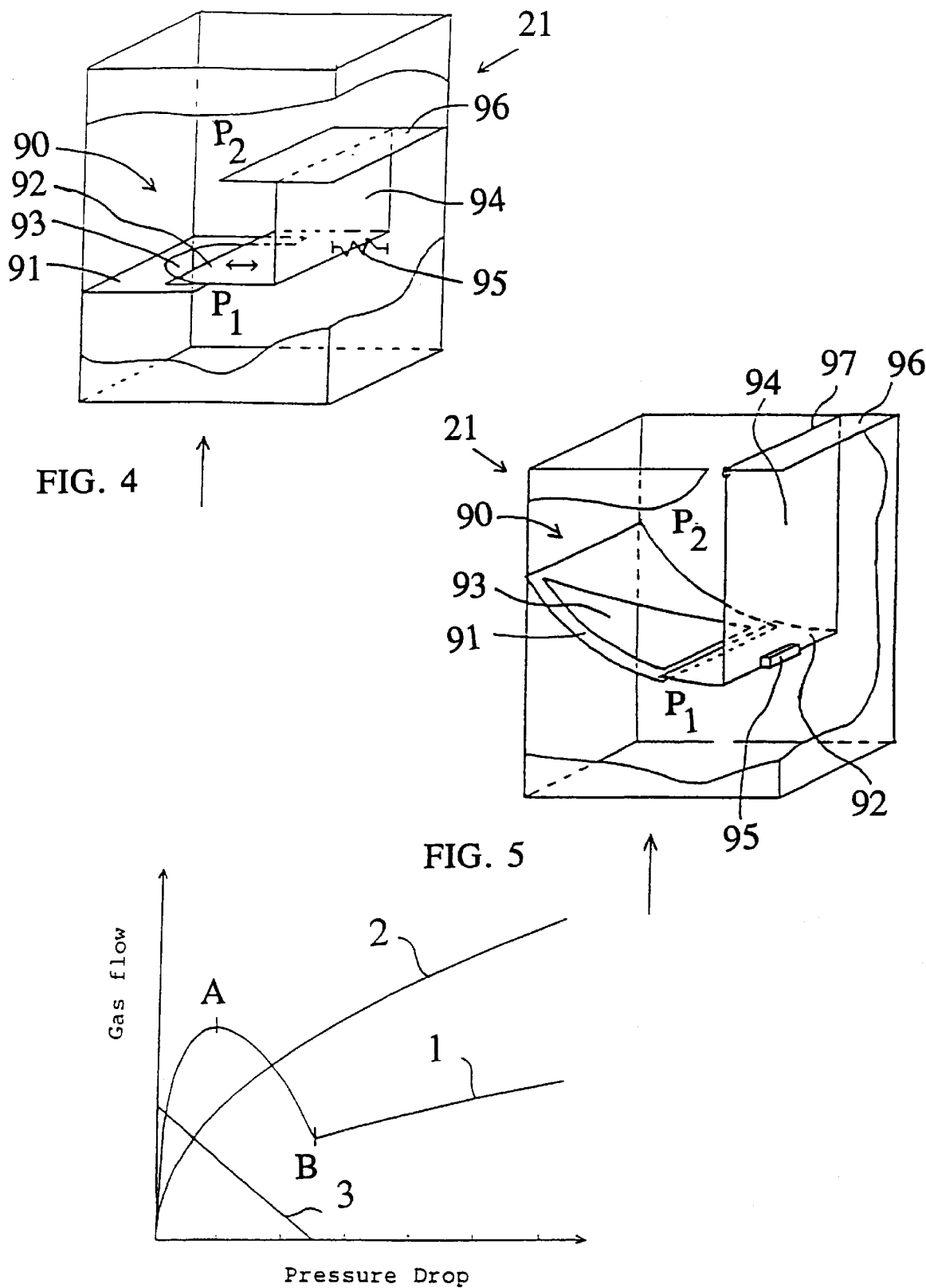
FIG. 4 shows a fourth embodiment of a flow regulator which may be used according to the invention.
FIG. 5 shows a fifth embodiment of a flow regulator which may be used according to the invention.
FIG. 6 shows operational curves for the gas flow through a duct with a specific flow regulator and, respectively, without any regulator.

The flow regulators 21 shown in FIGS. 1 to 3 are of the type which comprises one or several venturi-like nozzle means, whereas the flow regulators shown in FIGS. 4 and 5 are of the type which comprises one or several orifice-like nozzle means.

The flow regulator 21 shown in FIG. 1 comprises one or several venturi-like nozzle parts 45, each being fitted at their one end, via arms 46, for rotation about an axis 43 fitted at the wall of the regulator. Each nozzle part 45 takes up a variable part of the passage area and thus acts, by itself, as a flow restricting restriction means 44 which, during operation, moves between a first and a second extreme position in response to the prevailing pressure conditions in the regulator. In its first extreme position shown by a solid line in the figures, the nozzle part 45 restricts to minimum extent the cooling gas flow through the regulator 21, whereas in its second extreme position shown by a dotted line it restricts the flow to maximum extent. To prevent the nozzle part 45 from shutting off the cooling gas flow completely and to enable the second extreme position of the nozzle part 45 to be adjusted, the regulator comprises a stop and adjusting means 51, for example in the form of a screw. The regulator 21 also comprises an outer torque characteristic control element, here shown in the form of a spring 52.

The flow regulator 21 shown in FIG. 2 comprises a rocking means 41 which can be moved between a first and a second extreme position by rotation about an axis 43. In the figure the rocking means 41 is shown in its first extreme position. At one end the rocking means 41 consists of a venturi-like nozzle part 45 and at its other end it consists of a restriction part 44 which in the shown embodiment comprises two louvres 47 which via connecting arms 46 are connected to the nozzle part 45. The connecting arms 46 restrict just strictly the flow through the regulator 21. Two additional louvres 48, which operate interactively with the louvres 47 of the restriction means 44, are provided on the wall of the regulator opposite the louvres 47. To prevent the cooling gas from escaping behind the end parts 45 and 47 of the rocking means 48 after it has moved away from its first extreme position, the walls of the regulator are equipped with complementary bulges 49 and 50 for accommodating the end parts 45 and 47 in the first extreme position of the rocking means 41. The flow regulator 21 shown in FIG. 2 may also, in similarity with the one shown in FIG. 1, comprise a stop and adjusting means 51, not shown, and an outer torque characteristic 52, here shown in the form of a torque arm 53 and a spring 54 which is attached to the shaft 43 and the machine frame indicated at 55, respectively.

The flow regulator 21 shown in FIG. 3 also comprises a variable, venturi-like nozzle part 45 which, via a connecting arm 46 which is rotatable about an axis 43, is connected to a restriction means 44. This flow regulator 21 may also, like the previously mentioned regulators, comprise a stop and adjusting means 51, not shown, and an outer torque characteristic 52, here shown in the form of a torque arm 56 which comprises an adjustable weight 57, and being attached to the axis 43.

The flow regulators 21 shown in FIGS. 1, 2, and 3 operate as follows. If the pressure conditions before or after the regulator 21 are changed so that the gas flow, indicated by the arrow, through the regulator is virtually changed, the nozzle part 45 will, for example in event of a virtual flow increase which may occur if the flow resistance of the material bed is reduced, be subjected to a minor static pressure, and, therefore, it will have a tendency to move to the left in the figures. In the embodiment shown in FIG. 1, the restriction means 44 will thus immediately limit the gas flow by restricting the passage area, whereas the restriction means 44 in the embodiments shown in FIGS. 2 and 3 by means of the connecting arm or arms 46 hereby will be forced in the right-hand direction in the figures, thus limiting the gas flow by restricting the passage area.

The flow regulators 21 shown in FIGS. 4 and 5 both comprise an orifice-like nozzle means 90 which consists of two overlapping plates 91 and 92. The plate 91 which is attached to the duct wall is equipped with an aperture, thereby forming in conjunction with the plate 92, which is capable of reciprocating action, as shown by means of the double arrow, a variable nozzle opening 93. In the embodiment shown in FIG. 4 the plates 91 and 92 are made up of plane plates, whereas in the embodiment shown in FIG. 5 they are made up of curved plates with a common centreline of curvature 97.

In both embodiments the displacement of the plate 92 is effected by means of a movable plate 94 attached thereto, and which plate 94 is automatically moved and adjusted as a function of the pressure differential $P_1-P_2$ across the nozzle, as on one side of the plate prevails the pressure $P_1$ upstream of the nozzle opening whereas, on the other side of the plate prevails the pressure $P_2$ downstream of the nozzle opening 93. Both embodiments also include a plate 96 for separating the two pressure areas. In order to obtain the desired operational curve for the nozzle, the movable plate 94 is directly or indirectly connected to an outer characteristic controlling element 95.

In the embodiment shown in FIG. 4, the plate 94 is configured for transverse displacement relatively to a fixed plate 96 and connected to a spring 95 which in turn is attached to the wall of the duct. In the embodiment shown in FIG. 5, the plate 94 is pivotally fitted at one end around the line 97, and equipped, at its other end, with a weight 95.

Both embodiments may be configured so that they will meet any desirable correlation between the gas flow through the nozzle and the pressure drop across the nozzle. In practice, this may be done by calculating, based on a number of different pressure differentials $P_1$–$P_2$, and hence different positions of equilibrium of the displaceable plate 92, the area of the opening 93 required to obtain the desired gas flow for each specific pressure differential. On the basis of these calculations of the area, it will be possible to determine the configuration, or in other words the longitudinal and transverse dimensions of the recess in the plate 91.

Both in FIG. 4 and 5, the recess, and hence the nozzle opening 93, is configured so that the absolute change of the area of the nozzle opening 93 is reduced with increased displacement of the plate 92 in left-hand direction in the Figures.

The operational curves in FIG. 6 indicate the correlation between the pressure drop across and the gas flow through a duct which comprises a specific flow regulator, curve 1, and, respectively, a duct without regulator, curve 2. Curve 3 indicates the flow opening in the duct with regulator. It appears from curve 2 that the pressure drop across the duct without regulator increases as the gas flow is increased. Since the fan installation maintains a constant pressure drop for the particular duct, it may be concluded that the gas flow through the duct, and hence through the bed of material, decreases as the pressure drop across the bed increases, which happens when the bed thickness is increased, and, conversely, that it rises as the pressure drop across the bed decreases, which happens when the thickness of the bed is reduced. This is undesirable since it may give rise to the aforementioned problems in terms of poor gas-solid contact and tunnel formations.

By fitting a flow regulator, such as one of the regulators described above, in the duct it will be possible to obtain an operational curve similar to the one shown at curve 1. As it appears, curve 1 has an interval A to B within which the gas flow through the duct decreases as the pressure drop across the duct increases. With the total pressure drop across the duct and bed being constant, this means, as long as the operation is maintained within the interval A to B, that the gas flow through the duct and hence through the material bed will rise as the pressure drop across the bed increases, and, conversely, that it will decrease as the pressure drop across the bed is reduced. Hence the previously mentioned problems in terms of poor gas solid contact and tunnel formations will be eliminated or at least substantially reduced. The inclination of the curve interval A to B indicates the intensity with which the regulator reacts to a specific pressure change. From the point B on the curve 1 and in right-hand direction, the regulator is closed to maximum extent, as is apparent from curve 3, and, therefore, the gas flow through the duct depends on leaks, if any, and on the minimum passage area which has been selected.

Figure 7:
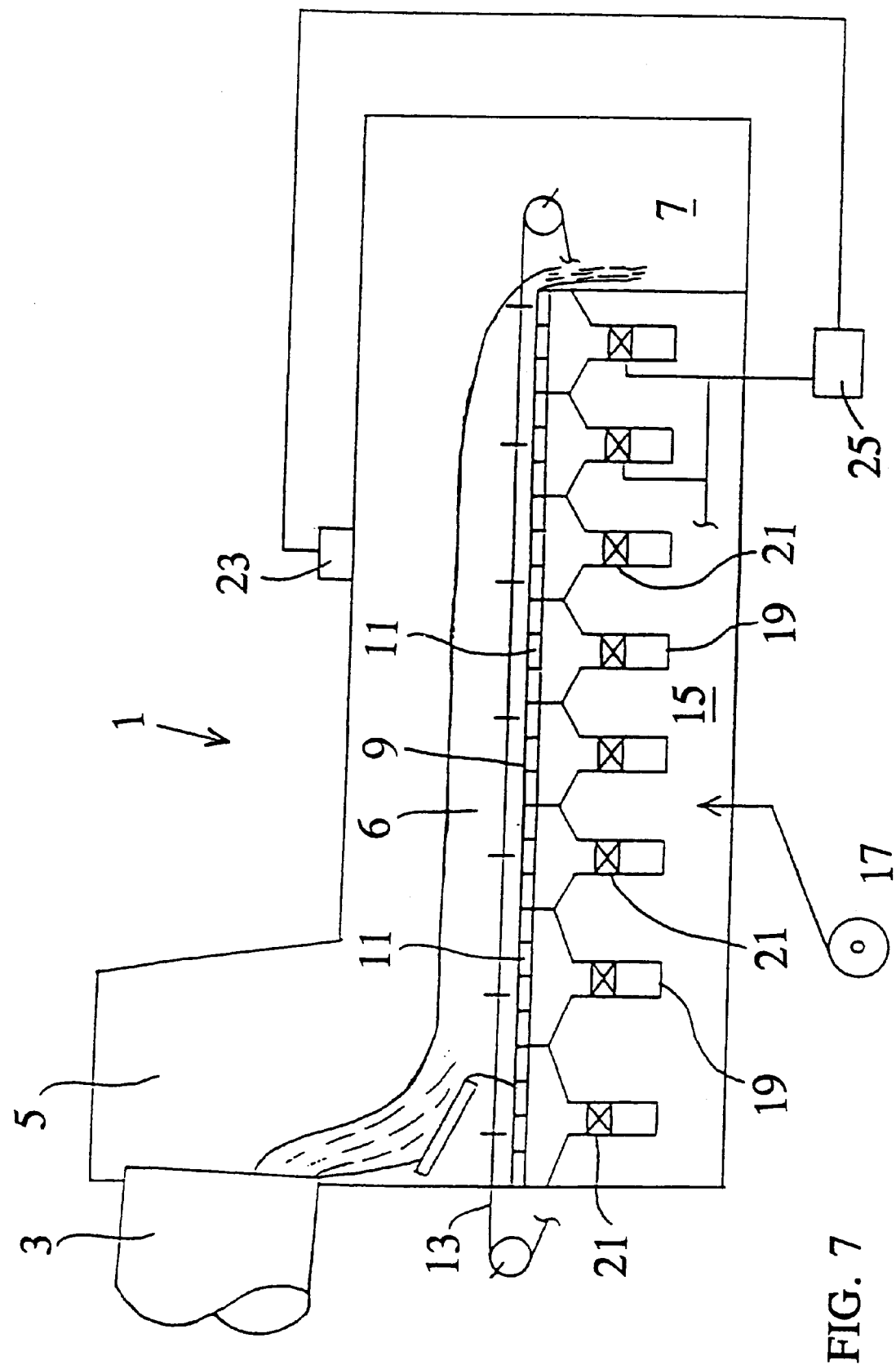
FIG. 7 shows a side view of a first type of grate cooler which comprises flow regulators according to the invention.

In FIG. 7 is shown a grate cooler 1 which comprises an inlet end 5 and an outlet end 7. The grate cooler 1 is connected to a rotary kiln 3 from which it receives hot material which is to be cooled. The material from the rotary kiln drops onto a grate surface 9 provided in the cooler 1 and it is conveyed as a material layer 6 on this surface from the inlet end 5 of the cooler to the outlet end 7 by means of a drag chain 15. Grate 9 shown in FIG. 7 is stationary, being made up of a great number of consecutive rows of grate shoes 11 which rows extend transversely across the transport direction of the material. Under the grate 9 the cooler 1 comprises a compartment 15 which is supplied with cooling gas from a fan installation 17. The compartment 15 may, both in the longitudinal direction of the cooler and transversely hereof, be divided into a number of smaller compartments, not shown, and, if so, cooling gas is supplied to each single compartment. In the compartment 15 and in connection with the grate 9, the cooler 1 comprises a number of ducts 19 for sectionalized feeding of the cooling gas to the grate 9. The ducts 19 are arranged side by side both in the longitudinal and transverse direction of the cooler. The number of ducts 19 and the area of the grate which each duct must feed with cooling gas are individually selected for each cooler installation.

In order to ensure that the cooling gas flow through the grate 9 and the thereon deposited material layer, which is to be cooled, is distributed in a desirable and well-defined manner across the entire surface of the grate, regardless of the composition of the material layer and its distribution on the grate, the cooler 1 comprises in each duct a flow regulator 21.

As previously mentioned, each single flow regulator 21 compensates for the changes in the flow resistance of the superjacent material layer so that the total flow resistance of the cooling gas through the respective duct 19 and the superjacent material layer is constantly maintained within a very narrow interval. Through an appropriate dimensioning of the flow regulators 21, thereby obtaining an operational curve which corresponds to the curve 1 described above in connection with FIG. 6, it may be obtained, as long as the operation is maintained within the interval A to B, that the gas flow through the duct and hence through the material 6 to be cooled increases as the pressure drop across the material layer 6 is increased, and, conversely, that it decreases as the pressure drop across the material layer 6 is reduced. hereby will be obtained a more efficient cooling of the material, also in the areas where the cooling gas encounters the greatest resistance, and that the tendency towards formation of tunnels is reduced.

The cooler 1 shown in FIG. 7 further comprises measuring and monitoring equipment 23 which, via a control unit 25, is connected to each single flow regulator 21.

Figure 8:
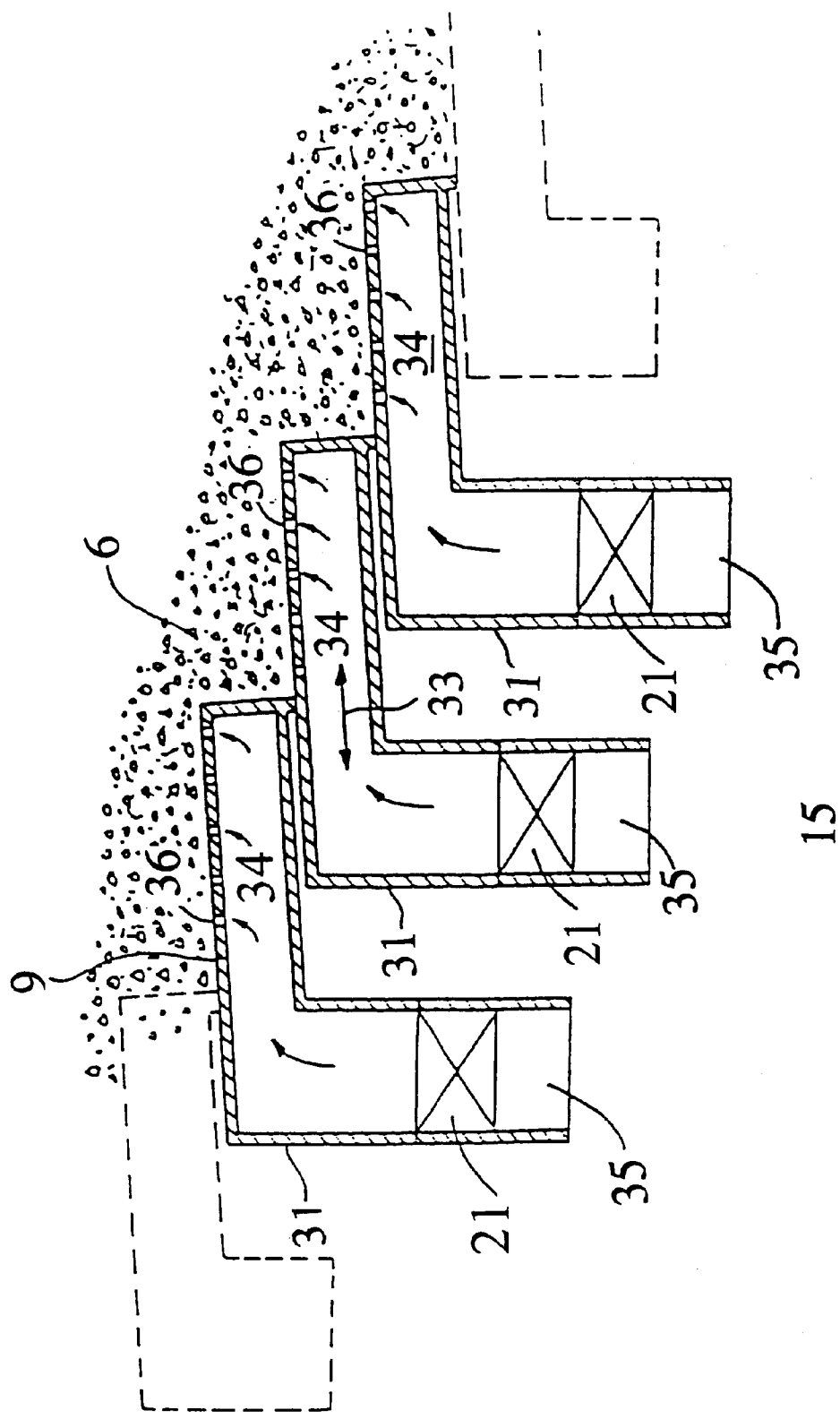
FIG. 8 shows a part of another type of grate cooler which also comprises flow regulators according to the invention.

In FIG. 8 is shown a part of a grate cooler of the kind which comprises a number of overlapping rows of grate shoes 31 where each second row is arranged so that it is capable of reciprocating action, as indicated by the double arrow 33, for propelling the material 6 through the cooler. As shown in the figure, each grate shoe comprises an upper grate part 34 which supports the material layer 6 and having passages 36 for cooling gas, and a lower duct part 35 for supply of cooling gas from an underlying compartment 15 to the grate part 34.

In order to regulate the gas flow through each single grate shoe in similar manner as done in the cooler shown in FIG. 7 and thereby obtain a gas flow which is distributed in a desirable and well defined manner across the entire grate surface, the cooler shown in FIG. 8 comprises in each duct a flow regulator 21.

Several grate shoes 31 in the same row may be supplied with cooling gas via the same duct part 35, thereby reducing the total number of flow regulators.

Figure 9:
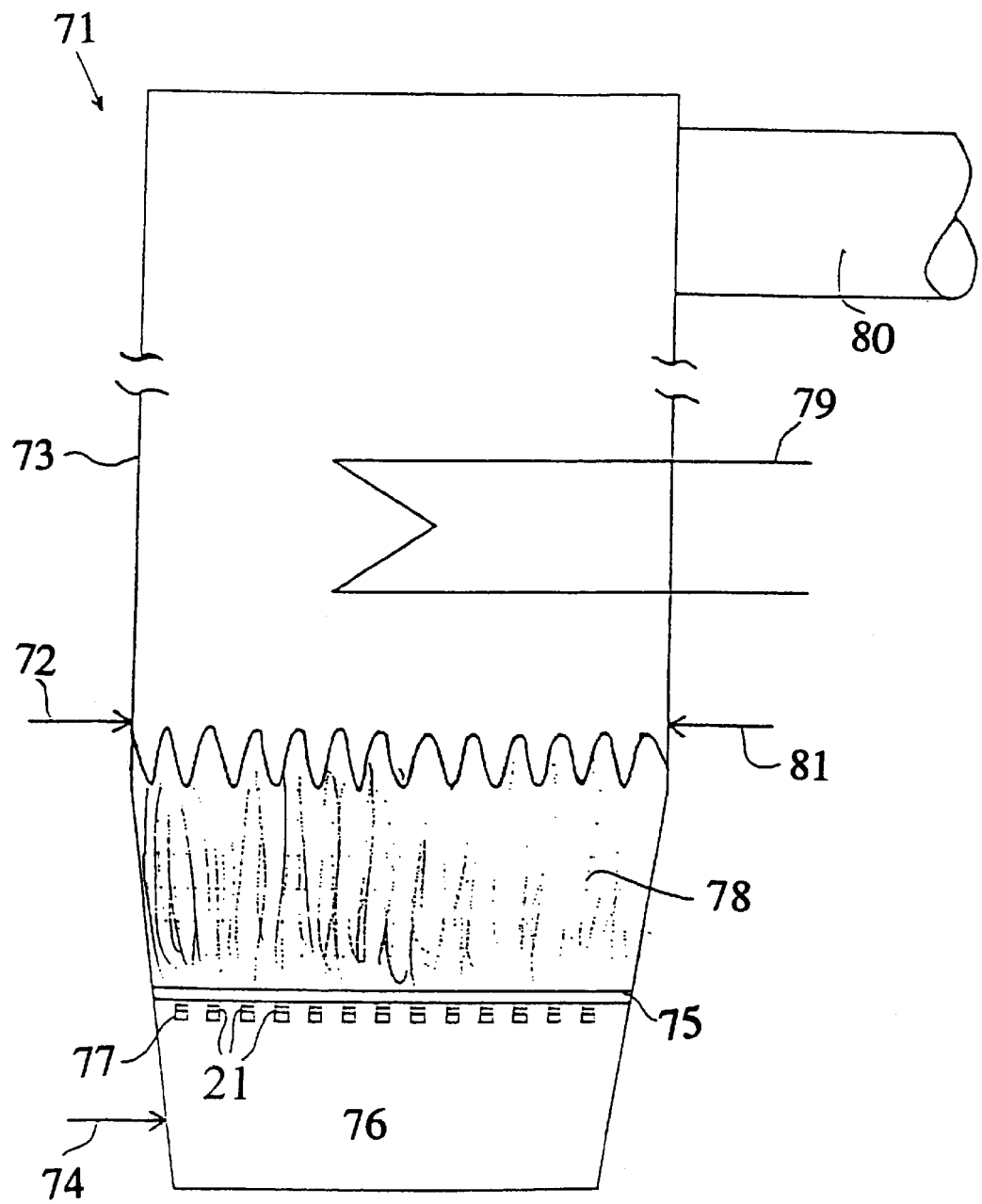
FIG. 9 shows a fluidized bed kiln which comprises flow regulators according to the invention.

In FIG. 9 is shown an example of a fluidized bed kiln 71 which comprises a reactor in the form of a vessel 73, a gas distribution bottom 75 which is located in the lowermost part of the vessel 73, and incorporating through-going fluidizing nozzles, not shown. The gas distribution bottom may comprise an arbitrary number of fluidizing nozzles, but typically comprises between 1 and 150 per square meter, dependent on the type of fluidizing nozzle being used. The kiln is supplied with fuel, and any auxiliary materials, such as lime, via an inlet 72 and with combustion/fluidizing gas via an inlet 74 and a compartment 76. In the compartment 76 and connected to the gas distribution bottom 75 the kiln 71 comprises a number of ducts 77 for sectionalized feeding of the combustion/fluidizing gas to the fluidizing nozzles of the gas distribution bottom 75.

During the operation of kiln, the fuel is burned in a fluidized bed 78 subject to constant feeding of combustion gas from the compartment 76 via the ducts 77 and the fluidizing nozzles. The flue gas from the combustion process is conducted up through the vessel 73 and exchanges heat with a heat exchanger 79 prior to its discharge through the gas outlet 80. Particles settled out from the flue gas are recirculated to the bed via an inlet 81.

In a fluidized bed kiln which is operated under optimum conditions the bed 78 will exhibit stable behaviour characteristics and will be uniformly distributed across the entire gas distribution bottom 75. However, in practice, it has been ascertained that destabilization of the bed 78 may occur if the bed material is dispersed unevenly across the gas distribution bottom 75, thereby generating areas where the thickness of the bed, and hence the pressure loss, is very small. Unless the material bed 78 is quickly smoothened out, the combustion gas will, with a self-energizing effect, penetrate the bed in these areas, and, in all probability, tunnels will be formed in the bed 78.

For minimization of this problem in similar manner as done in connection with the coolers shown in FIGS. 7 and 8 and in order to obtain a more uniform distribution of the bed material across the entire gas distribution bottom 75, it is proposed, according to the invention, that the kiln 71 be equipped with flow regulator 21 in each duct 77.

In similarity with the previously described grate cooler, it is thus obtained, as long as the operation is maintained within the interval A to B, see FIG. 6, that the gas flow through each duct 77 and hence through the adjacent material bed 78 increases as the pressure drop across this material bed 78 is increased, and, conversely, that it decreases as the pressure drop across this material bed 78 is reduced, thereby reducing the tendency towards formation of tunnels.

What is claimed is:

1. A method for treating a bed of particulate material which is supported by a gas distribution bottom, utilizing a treatment gas which is conducted through a plurality of ducts in sectionalized manner to and directed up through the gas distribution bottom and the bed of material from one or several underlying compartments; the flow of the treatment gas through each duct being regulated by means of a flow regulator provided in each duct in order to compensate, at least in part, for a changing pressure drop through the bed; and each flow regulator being automatically movable in direct response to the gas flow rate in the respective duct; characterised in that the regulation is effected continuously variably within a predetermined range whereby the flow regulator reduces the gas passage area in the duct when the gas flow begins to rise, and vice versa.

2. A method according to claim 1, wherein the gas flow through each duct is regulated so that within an operational range, the gas flow does not decrease or increase as the pressure drop across the superjacent part of the bed increases or decreases, respectively.

3. A method according to claim 1, wherein the gas flow through each duct is regulated so that it increases or decreases as the pressure drop across the superjacent part of the bed increases or decreases, respectively.

4. A method according to claim 1, wherein the gas flow through each duct is regulated so that it is maintained substantially constant at any pressure drop occurring across the superjacent part of the bed.

5. A method according to claim 1, 2, 3 or 4, wherein a datum setting of each flow regulator is adjusted tin order to achieve the desired flow characteristics.

6. A method according to claim 5, wherein the datum setting of the flow regulators is automatically adjusted by means of measuring and monitoring equipment which is connected to a control unit.

7. A apparatus for treating a bed of particulate material, the apparatus comprising a gas distribution bottom for supporting the bed to be treated and provided with a plurality of ducts for sectionalized supplying of treatment gas from one or several underlying compartments; each duct having a respective flow regulator which is automatically movable in direct response to the gas flow rate in the respective duct; characterised in that the flow regulator provides a continuously variable regulation of the gas flow within a predetermined range; the regulator being arranged to reduce the gas passage area in the duct when the gas flow begins to rise, and vice versa.

8. An apparatus according to claim 7, wherein each flow regulator comprises one or several venturi-like nozzle means, each of which is connected through a connecting means to a variable restriction means, of which the total nozzle opening area is variable.

9. An apparatus according to claim 7, wherein each flow regulator comprises one or several variable orifice-like nozzle means, of which the total orifice area is variable.

10. An apparatus according to claim 7, wherein each nozzle means comprises at least two flow restriction overlapping plates which, in conjunction, define at least one nozzle opening and in that at least one of the is movable over the other(s) and is connected to means for generating this displacement in response to the gas flow condition.

11. An apparatus according to claim 10, wherein on one side of each movable plate there prevails the pressure $P_1$ upstream of the nozzle opening and on the other side of there prevails the pressure $P_2$ downstream of the nozzle opening, and in that the movable plate is directly or indirectly connected to a characteristic controlling means.

12. An apparatus according to claim 11, wherein the flow restriction means are configured so that the total nozzle opening area for any pressure difference prevailing across the nozzle within a specific operating range precisely result in the desired gas flow through the duct.

13. An apparatus according to 8 and 9 to 12, wherein each flow regulator (21) comprises means for adjusting its datum setting.

14. An apparatus according to claim 13, which comprises measuring and monitoring equipment which via a control unit is connected to the adjusting means of each flow regulator.

15. An apparatus according to any one of claims 7 to 8 and 10 to 13, which is a grate cooler for cooling hot particulate material, such as cement clinker being discharged from a cement kiln.

16. An apparatus according to any one of claims 7 to 8 and 9 to 12, which is a fluidized bed kiln.

* * * * *